US012106631B2

(12) United States Patent
Shepherd et al.

(10) Patent No.: US 12,106,631 B2
(45) Date of Patent: *Oct. 1, 2024

(54) PROVIDING INCENTIVES FOR DIRECTING CASHOUT FUNDS TO A CASHLESS WALLET ACCOUNT, AND RELATED SYSTEMS, DEVICES, AND METHODS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,858

(22) Filed: Oct. 10, 2022

(65) Prior Publication Data

US 2023/0036246 A1  Feb. 2, 2023

Related U.S. Application Data

(63) Continuation of application No. 16/419,661, filed on May 22, 2019, now Pat. No. 11,468,739.

(51) Int. Cl.
*G06Q 30/02* (2023.01)
*G06Q 20/18* (2012.01)
*G06Q 20/36* (2012.01)
*G06Q 30/0207* (2023.01)
(Continued)

(52) U.S. Cl.
CPC ......... *G07F 17/3255* (2013.01); *G06Q 20/18* (2013.01); *G06Q 20/36* (2013.01); *G06Q 30/0209* (2013.01); *G06Q 50/34* (2013.01); *G07F 17/3267* (2013.01); *G07F 17/3288* (2013.01)

(58) Field of Classification Search
CPC ............ G07F 17/3255; G07F 17/3267; G07F 17/3288; G07F 17/0035; G07F 19/20; G06Q 20/18; G06Q 20/36; G06Q 30/0209; G06Q 50/34; G06Q 20/367
See application file for complete search history.

(56) References Cited

U.S. PATENT DOCUMENTS 6,852,031 B1  2/2005  Rowe
7,094,148 B2 *  8/2006  Baerlocher ......... G07F 17/3265
463/20
(Continued)

FOREIGN PATENT DOCUMENTS

WO   WO 2005/070509 A1   8/2005

*Primary Examiner* — Thuy N Nguyen
(74) *Attorney, Agent, or Firm* — Sage Patent Group

(57) ABSTRACT

Systems, devices, and methods relate to directing cashout funds, for example in a casino environment, and in particular to providing incentives for directing cashout funds to a cashless wallet account. An instruction is received by a kiosk device, such as a gaming device, to dispense a first cashout amount. Based on the instruction, a display device of the kiosk device displays a message indicating a request to choose an option of a plurality of options. The options include a first option to receive the first cashout amount at the electronic kiosk device and a second option to receive a second cashout amount different from the first cashout amount in a cashless format. In response to receiving a selection, the respective cashout amount is dispensed in the chosen format.

17 Claims, 13 Drawing Sheets

(51) Int. Cl.
*G06Q 50/34* (2012.01)
*G07F 17/32* (2006.01)

(56) References Cited

U.S. PATENT DOCUMENTS

| | | | |
|---|---|---|---|
| 7,704,137 B2* | 4/2010 | Englman | G07F 17/3267 463/16 |
| 7,780,511 B2* | 8/2010 | Casey | G07F 17/3267 463/16 |
| 7,955,169 B2* | 6/2011 | Walker | G07F 17/3269 463/16 |
| 8,550,901 B2* | 10/2013 | Walker | G07F 17/3244 463/25 |
| 10,217,317 B2 | 2/2019 | Nelson | |
| 10,319,186 B2* | 6/2019 | Donavan | G07F 17/3209 |
| 2005/0124407 A1 | 6/2005 | Rowe | |
| 2005/0159211 A1* | 7/2005 | Englman | G07F 17/3267 463/25 |
| 2006/0030391 A1* | 2/2006 | Casey | G07F 17/3211 463/16 |
| 2006/0154722 A1* | 7/2006 | Walker | G07F 17/32 463/25 |
| 2006/0223615 A1* | 10/2006 | Englman | G07F 17/3244 463/17 |
| 2007/0275777 A1* | 11/2007 | Walker | G07F 17/3244 463/16 |
| 2008/0254893 A1* | 10/2008 | Patel | G07F 17/3267 463/42 |
| 2010/0137056 A1* | 6/2010 | Hoffman | G07F 17/32 463/43 |
| 2011/0077067 A1* | 3/2011 | Ellis | G07F 17/32 463/16 |
| 2011/0105216 A1* | 5/2011 | Cohen | G07F 17/3244 463/20 |
| 2011/0118010 A1* | 5/2011 | Brune | G07F 17/3267 463/43 |
| 2011/0275433 A1 | 11/2011 | Bramble | |
| 2013/0065668 A1* | 3/2013 | LeMay | G07F 17/3244 463/25 |
| 2013/0288782 A1 | 10/2013 | Hornik et al. | |
| 2013/0331171 A1* | 12/2013 | Brune | G07F 17/3267 463/20 |
| 2015/0066613 A1* | 3/2015 | Zhou | G06Q 20/321 705/14.12 |
| 2015/0199868 A1* | 7/2015 | Kelly | G07F 17/3225 463/25 |
| 2015/0206393 A1* | 7/2015 | Hoffman | G07F 17/3274 463/25 |
| 2016/0035181 A1* | 2/2016 | Caputo | G07F 17/32 463/21 |
| 2016/0086426 A1* | 3/2016 | Gilmore | G07F 17/3267 463/20 |
| 2017/0092043 A1* | 3/2017 | Shiraishi | G07F 17/3225 |
| 2017/0092054 A1* | 3/2017 | Petersen | G07F 17/3244 |
| 2017/0092061 A1* | 3/2017 | Nelson | G07F 17/3244 |
| 2018/0047249 A1 | 2/2018 | Nelson et al. | |
| 2018/0061179 A1* | 3/2018 | Miri | G07F 17/3241 |
| 2018/0108216 A1* | 4/2018 | Donavan | G07F 17/3209 |
| 2018/0165916 A1* | 6/2018 | Marantelli | A63F 13/00 |
| 2019/0066441 A1* | 2/2019 | LeStrange | G07F 17/3246 |
| 2019/0130389 A1* | 5/2019 | Fieglein | G07F 9/001 |
| 2019/0188962 A1* | 6/2019 | Higgins | G07F 17/3239 |
| 2019/0197526 A1 | 6/2019 | Higgins et al. | |
| 2019/0287341 A1* | 9/2019 | Donavan | G07F 17/42 |
| 2020/0074787 A1 | 3/2020 | Casey | |
| 2020/0111319 A1* | 4/2020 | Palmisano | G06Q 50/34 |
| 2020/0372755 A1* | 11/2020 | Shepherd | G06Q 20/367 |

* cited by examiner

PROVIDING INCENTIVES FOR DIRECTING CASHOUT FUNDS TO A CASHLESS WALLET ACCOUNT, AND RELATED SYSTEMS, DEVICES, AND METHODS

CROSS-REFERENCE TO RELATED APPLICATION

This application is a continuation of, and claims priority to and the benefit of, U.S. patent application Ser. No. 16/419,661, which was filed May 22, 2019, the disclosure and content of which is incorporated by reference herein in its entirety.

BACKGROUND

Embodiments described herein relate to directing cashout funds, for example in a casino environment, and in particular to providing incentives for directing cashout funds to a cashless wallet account, and related systems, devices, and methods. Many gaming enterprises, such as casinos, employ cashless financial accounts as a way of managing wagering activity by players. One example of a financial account used for managing wagering activity is a cashless wagering wallet, which may be associated with a card and/or mobile device, and allows a player at a casino to place wagers and collect winnings without using cash. Many players and casinos currently rely on vouchers to transfer money to and from gaming devices on the gaming floor. At the end of the gaming day for a player, that player may cash their final voucher out at a kiosk or at the casino's cage. As cashless financial accounts are introduced, there is a need to transition players and establishments toward using these cashless financial accounts.

SUMMARY

According to an embodiment, a system for funding a cashless wallet account is disclosed. The system includes a processor circuit and a memory coupled to the processor circuit. The memory includes machine-readable instructions that, when executed by the processor circuit, cause the processor circuit to receive an instruction to dispense a first cashout amount at an electronic kiosk device. The machine-readable instructions further cause the processor circuit to, in response to receiving the instruction, cause a display device of the electronic kiosk device to display a message indicating a request to choose an option of a plurality of options comprising a first option to receive the first cashout amount at the electronic kiosk device and a second option to receive a second cashout amount different from the first cashout amount. The machine-readable instructions further cause the processor circuit to receive a selection value via an input device indicating a chosen option of the plurality of options. The machine-readable instructions further cause the processor circuit to, in response to the chosen option comprising the first option, cause the first cashout amount to be dispensed from a dispenser of the electronic kiosk device. The machine-readable instructions further cause the processor circuit to, in response to the chosen option comprising the second option, cause the second cashout amount to be provided in a cashless format.

According to another embodiment, a method is disclosed. The method comprises receiving, by a processor circuit, an instruction to dispense a first cashout amount at an electronic kiosk device. The method further comprises, in response to receiving the instruction, causing a display device of the electronic kiosk device to display a message indicating a request to choose an option of a plurality of options comprising a first option to receive the first cashout amount at the electronic kiosk device and a second option to receive a second cashout amount different from the first cashout amount. The method further comprises receiving, by the processor circuit, a selection value via an input device indicating a chosen option of the plurality of options. The method further comprises, in response to the chosen option comprising the first option, dispensing the first cashout amount from a dispenser of the electronic kiosk device. The method further comprises, in response to the chosen option comprising the second option, causing the second cashout amount to be provided in a cashless format.

According to another embodiment, an electronic kiosk device for funding a cashless wallet account is disclosed. The electronic kiosk device includes a display device, an input device, a dispenser, a processor circuit, and a memory coupled to the processor circuit. The memory includes machine-readable instructions that, when executed by the processor circuit, cause the processor circuit to receive an instruction from a user of the electronic kiosk device via the input device to dispense a first cashout amount from the dispenser. The machine-readable instructions further cause the processor circuit to, in response to receiving the instruction, cause the display device to display a message indicating a request to choose an option of a plurality of options comprising a first option to receive the first cashout amount as currency having a first monetary value from the dispenser and a second option to receive a second cashout amount as a credit balance having a second monetary value greater than the first monetary value. The machine-readable instructions further cause the processor circuit to receive a selection value via the input device indicating a chosen option of the plurality of options. The machine-readable instructions further cause the processor circuit to, in response to the chosen option comprising the first option, cause the dispenser to dispense the first cashout amount as the currency. The machine-readable instructions further cause the processor circuit to, in response to the chosen option comprising the second option determine a cashless wallet account associated with the user and cause the second cashout amount to credited to the cashless wallet account.

DETAILED DESCRIPTION

Embodiments described herein relate to directing cashout funds, for example in a casino environment, and in particular to providing incentives for directing cashout funds to a cashless wallet account, and related systems, devices, and methods. In some embodiments, an instruction is received by a kiosk device, such as a gaming device, to dispense a first cashout amount. Based on the instruction, a display device of the kiosk device displays a message indicating a request to choose an option of a plurality of options. The options include a first option to receive the first cashout amount at the electronic kiosk device and a second option to receive a second cashout amount different from the first cashout amount in a cashless format. In response to receiving a selection, the respective cashout amount is dispensed in the chosen format. In this manner, these and other embodiments provide a unique technical solution to the technical problem of migrating a user base toward using a cashless format, such as a cashless wallet account or for gambling across the casino, for receiving funds from inside or outside of the casino, and for transferring funds outside of the casino.

Figure 1A:
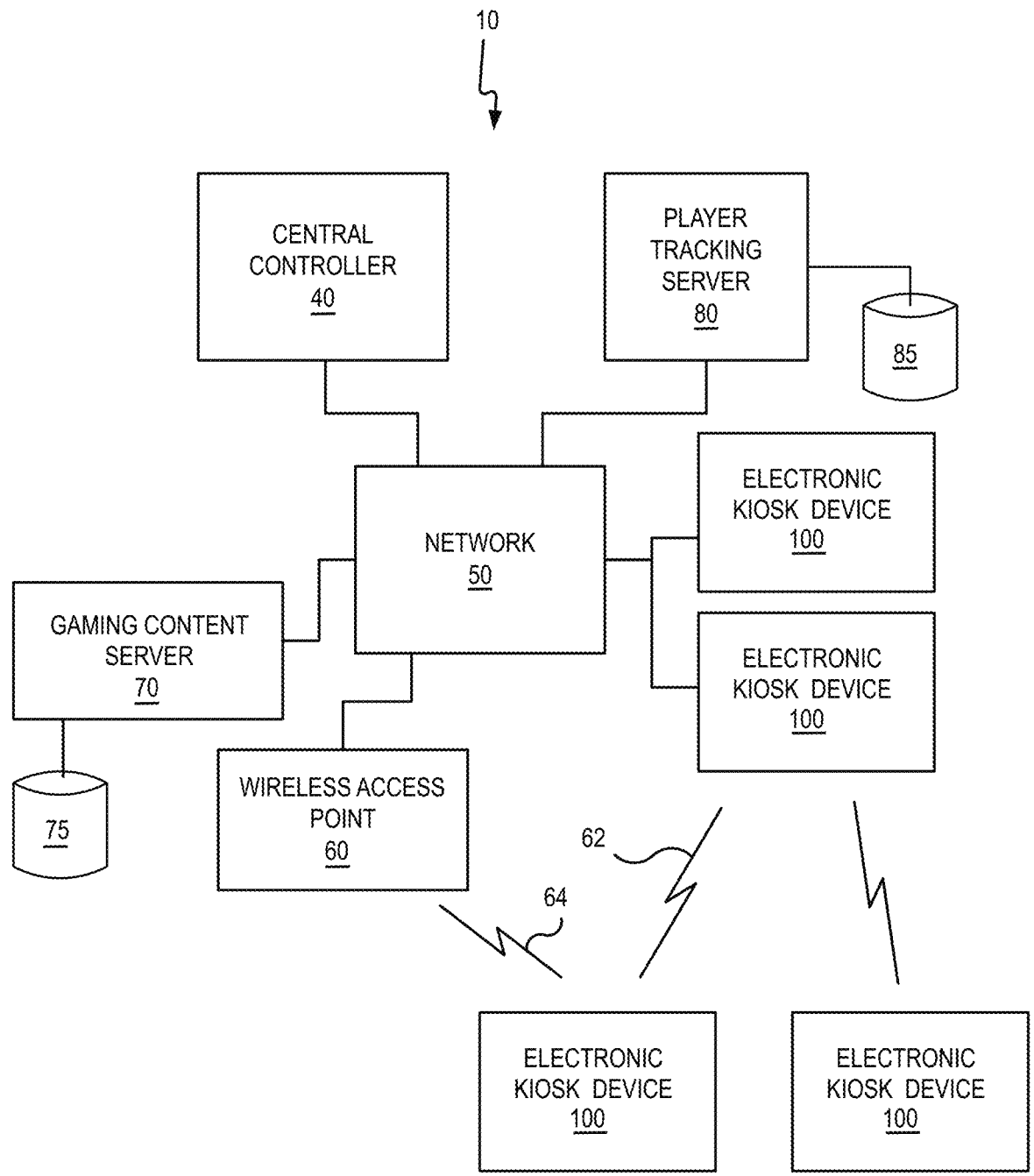
FIGS. 1A-1C are schematic block diagrams illustrating a network configurations for a plurality of gaming devices according to some embodiments.

Referring now to FIG. 1A, a system 10 including a plurality of electronic kiosk devices 100 is disclosed. The system 10 may be located, for example, on the premises of a gaming establishment, such as a casino, in a private residence, or may include components that are located at different locations. In this example, the electronic kiosk devices include electronic gaming machines (EGMs) in a casino environment that facilitate wagering games, and may also include other kiosks, such as automated teller machines (ATMs) or other machines that facilitate the redemption and distribution of funds associated with a player or other user, or with the wagering game, for example. The electronic kiosk devices 100 may be in communication with each other and/or a central controller 40 through a data communication network 50, or remote communication link. The data communication network 50 may be a private data communication network that is operated, for example, by the gaming facility that operates the electronic kiosk devices 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each of the electronic kiosk devices 100 may include a processing circuit that transmits and receives events, messages, commands or any other suitable data or signal between the electronic kiosk devices 100 and the central controller 40 and/or other electronic kiosk devices 100. The processor circuit of each electronic kiosk device 100 is operable to execute such communicated events, messages or commands in conjunction with the operation of the electronic kiosk devices 100. Moreover, the processor circuit of the central controller 40 is configured to transmit and receive events, messages, commands or any other suitable data or signal between the central controller 40 and each of the individual electronic kiosk devices 100. In some embodiments, one or more of the functions of the central controller 40 may be performed by one or more kiosk device processors. Moreover, in some embodiments, one or more of the functions of one or more kiosk device processors as disclosed herein may be performed by the central controller 40.

A wireless access point 60 provides wireless access to the data communication network 50. The wireless access point 60 may be connected to the data communication network 50 as illustrated in FIG. 1A, or may be connected directly to the central controller 40 or another server connected to the data communication network 50.

One or more content servers, such a gaming content server 70, may also be connected through the data communication network 50. The gaming content server 70 may manage delivery of the gaming content to the user of an electronic kiosk devices 100. The gaming content may be stored in a gaming content database 75. The gaming content server 70 may be implemented within or separately from the central controller 40 or other computing devices.

A player tracking server 80 may also be connected through the data communication network 50. The player tracking server 80 may manage a player tracking account that tracks the gameplay and spending and/or other player preferences and customizations of a player, i.e., the user of the electronic kiosk devices 100, manages loyalty awards for the player, manages funds deposited or advanced on behalf of the player, and other functions. Player information managed by the player tracking server 80 may be stored in a player information database 85.

The electronic kiosk devices 100 communicate with one or more elements of the system 10 to facilitate wagering games and/or redemption and distribution of funds associated with a user and/or with a wagering game. For example, in some embodiments, an electronic kiosk device 100 may communicate directly with another electronic kiosk device 100 over a wireless interface 62, which may be a WiFi link, a Bluetooth link, an NFC link, etc. In other embodiments, the electronic kiosk device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the electronic kiosk device 100 may communicate with other electronic kiosk devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

In some embodiments, the central controller 40 and/or gaming content server 70 may coordinate the generation and display of the gaming content to more than one user and/or to more than one electronic kiosk device 100. As described in more detail below, this may enable multiple users to interact with the same streaming video content and/or gaming content in real time. This feature can be used to provide a shared multiplayer experience to multiple users at the same time. Moreover, in some embodiments, the central controller 40 and/or gaming content server 70 may coordinate the generation and display of the gaming content to users at different physical locations.

Figure 1B:
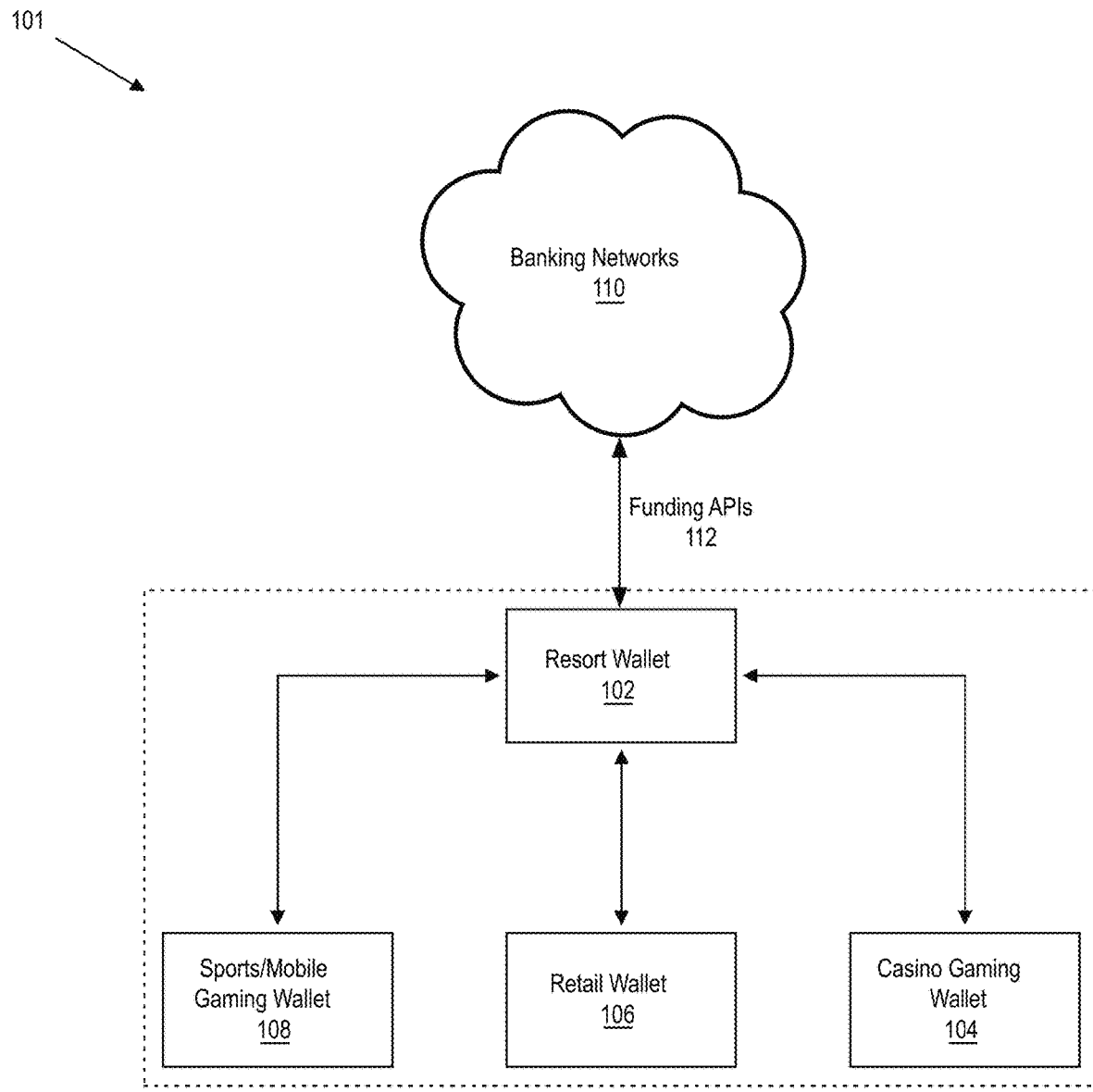

FIG. 1B is a diagram of a resort wallet system 101 comprising a plurality of cashless wallet accounts, including a sports/mobile gaming wallet, a retail wallet, and a casino gaming wallet, according to an embodiment, which is usable with the components of the system 10 of FIG. 1. The resort wallet system 101, which may be embodied in hardware, software, or a combination thereof, includes a resort wallet 102 that serves as a combined wallet for a number of other cashless wallet accounts and/or other financial accounts. In this example, the resort wallet 102 is linked with a casino gaming wallet 104, which is associated with a particular set of regulations, a retail wallet 106, which is associated with a different set of regulations, and a sports/mobile gaming wallet 108, which may be associated with another set of regulations as well. In this example, the resort wallet system 101 manages communication with one more banking networks 110 via one or more funding application programming interfaces (APIs) 112.

Figure 1C:
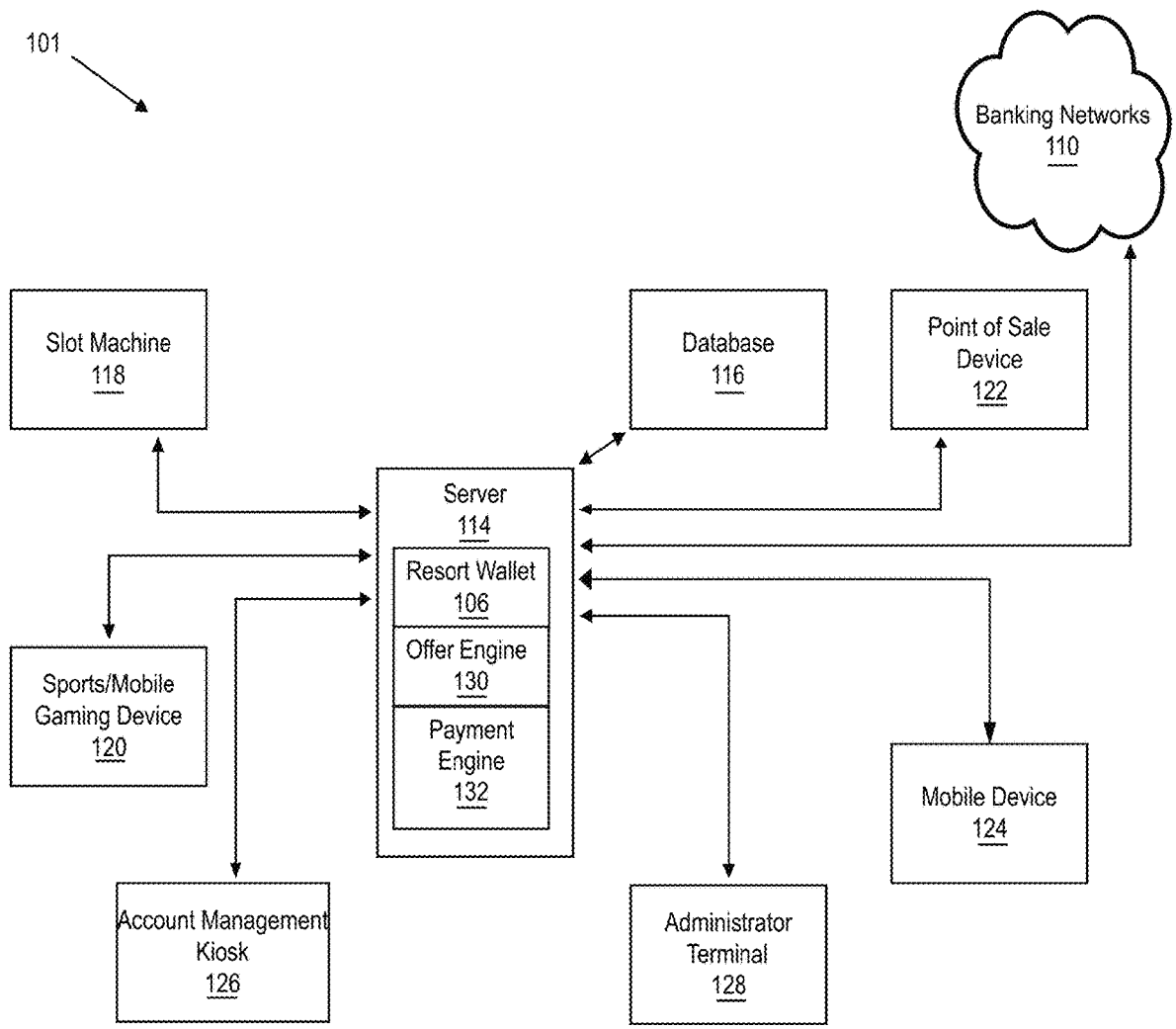

In one example, the resort wallet system 101 is embodied in a server-based system, such as the server 114 of FIG. 1C, coupled to a plurality of network-connected devices. In the example of FIG. 1C, the server 114, which may be part of the system 10 of FIG. 1A, may be communicatively coupled to a database 116 directly and/or via a wired or wireless network, for example. The server 114 may also be communicatively coupled to a plurality of devices, including the electronic kiosk devices 100 of FIG. 1, configured to interact with and/or manage certain aspects and/or features of the resort wallet system 101. For example, the server 114 may be coupled to one or more slot machines 118 and/or other gaming devices located on a casino floor. The slot machines 118 may be configured to access the casino gaming wallet 104 of a player for placing wagers for and paying out winnings to the player and may also be configured to access the retail wallet 106 for providing additional non-gaming features to the player. The server 114 may also be coupled to one or more mobile gaming devices 120 configured to facilitate a player making sports and/or other wagers with funds from an associated sports/mobile gaming wallet 108.

The server 114 may also be coupled to one or more point of sale devices 122, such as a checkout register and/or retail kiosk. The point of sale devices 122 may be configured to access the retail wallet 106 of the player for facilitating purchases and/or other retail transactions for the player. The server 114 may also be coupled to a player's own personal mobile device 124, such as a mobile phone and/or tablet, for example. The personal mobile device 124 may include hardware and/or software for accessing one or more of the wallets associated with the resort wallet system 101 and facilitating associated gaming and/or retail activity by the player via the mobile device 124. In some embodiments, the mobile device 124 may be configured to scan a voucher to attempt to redeem it, which may trigger the system 101 to incentivize creation of a cashless wallet account, to deposit funds into the cashless wallet account, etc.

The server 114 may also be coupled to one or more account management kiosks 126 for allowing a player to access and manage one or more of the accounts associated with the resort wallet system 101. The server 114 may also be coupled to one or more administrator terminals 128 for allowing an administrator and/or other authorized third party to access and manage one or more accounts associated with a player's resort wallet system 101. The server 114 or other components may also include an offer engine 130 for generating offers and incentives for different options, and may also include a payment engine 132 for managing monetary or non-monetary in various formats.

Figure 2A:
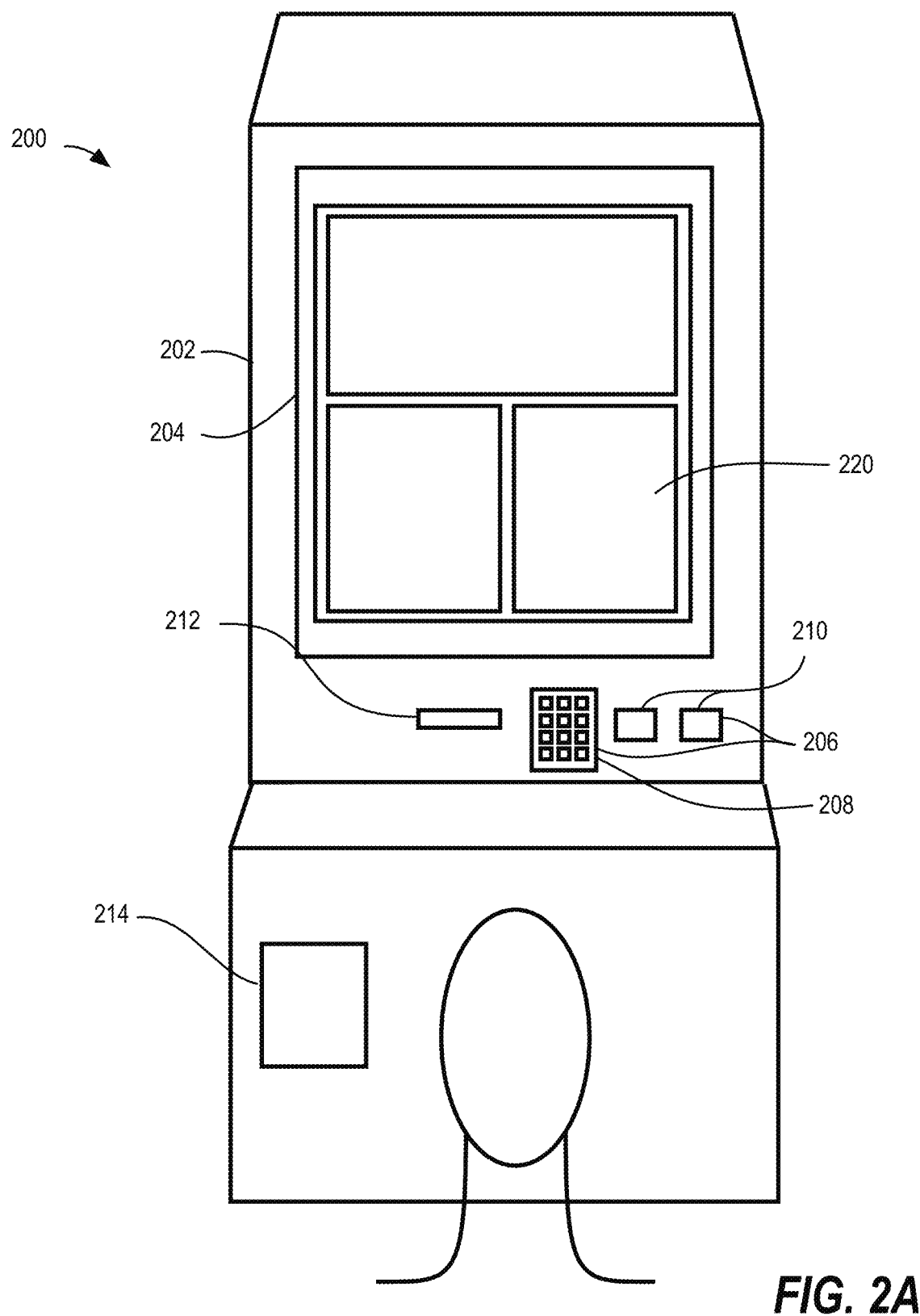
FIGS. 2A and 2B illustrate electronic kiosk devices having features for funding a cashless wallet account, according to some embodiments.
Figure 2B:
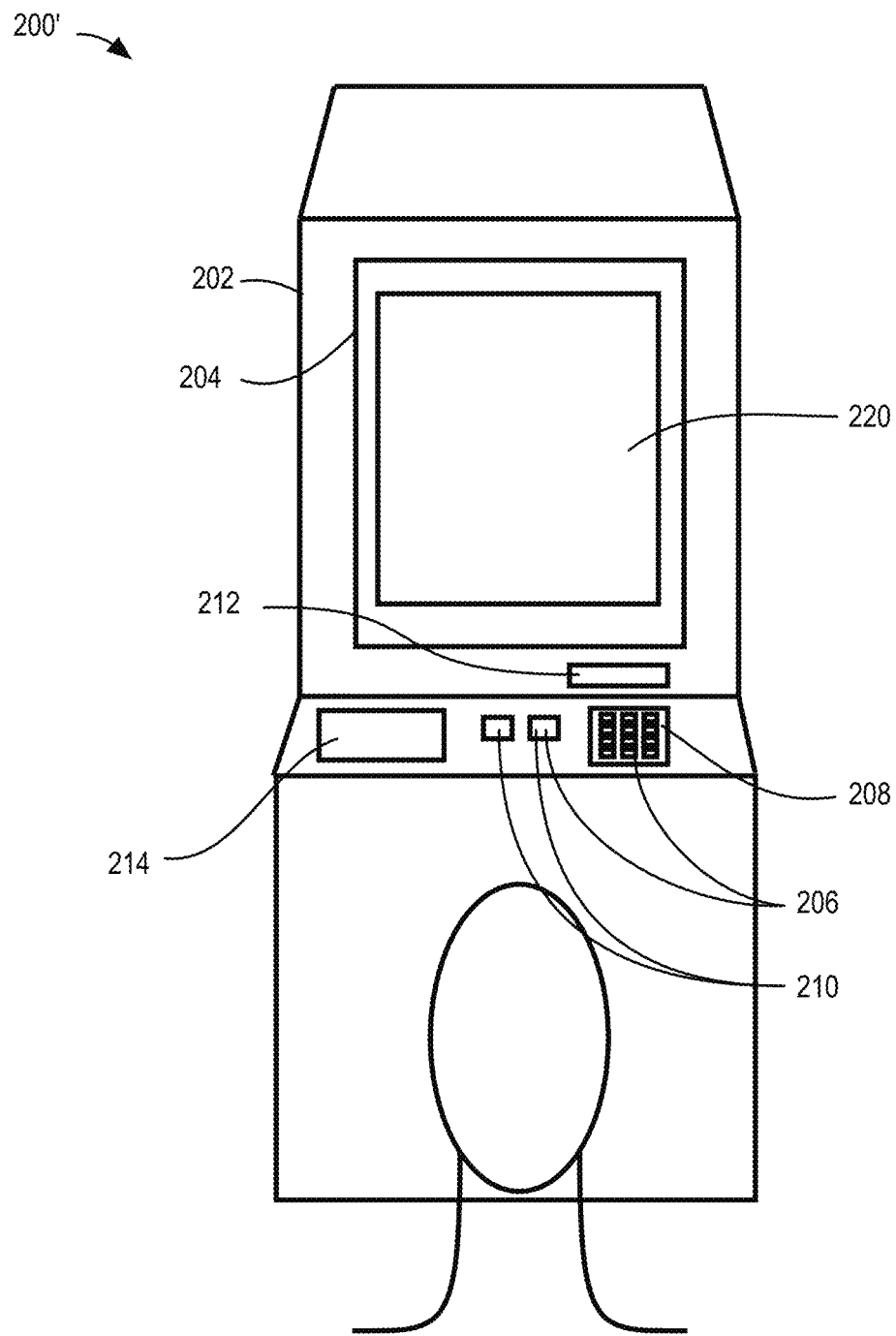

FIGS. 2A and 2B illustrate examples of electronic kiosk devices, such as an EGM 200 or ATM 200' having features for funding a cashless wallet account, according to some embodiments. Referring now to FIG. 2A, the electronic kiosk device is an EGM 200. In this embodiment, the EGM 200 may include a housing 202 having a display device 204, and a plurality of input devices 206, such as a keypad 208, buttons 210, etc., for receiving user input for playing the wagering game and otherwise interacting with the EGM 200. In some embodiments, the display device 204 may include a touchscreen interface for receiving user input as well. The display device 204 may also be a single display device or may include multiple display devices, such as a first display device for displaying video of the live sporting event and a second display device for displaying gaming and wagering information for example. The EGM 200 may include additional specialized hardware as well, such as an acceptor 212, for receiving currency (i.e., bills and/or coins), tokens, credit or debit cards, or other physical items associated with monetary or other value. For example, the acceptor 212 may receive a medium having a machine-readable code. The machine-readable code may be a printed code on a physical article, such as a voucher, for example, and the acceptor 212 may include an optical scanner device to optically read the printed code. In another example, the machine readable code may be electromagnetically encoded on a physical article, such as a magnetic strip or card chip on a card, and the acceptor 212 may include an electromagnetic reader device to electromagnetically read the magnetic strip, card chip, etc. It should also be understood that the EGM 200 may include a separate optical scanner device and/or electromagnetic reader device separate and apart from the acceptor 212 and/or other components as well. The EGM 200 may also include a dispenser 214, for dispensing items, such as physical items having monetary or other value (e.g., awards or prizes) or other items.

As will be discussed in detail below, the EGM 200 may include a processor circuit and a memory coupled to the processor circuit. The memory may include machine-readable instructions that, when executed by the processor circuit, cause the processor circuit to perform operations for operating the EGM 200 and/or other features described herein. In this example, the EGM 200 may include a graphical user interface (GUI) 220 displayed by the display device 204 for providing the video and gaming information to the player.

Referring now to FIG. 2B, the electronic kiosk device is an ATM 200', or similar device for receiving, exchanging, and dispensing currency. In some embodiments, the ATM 200' may be located in a casino environment, and may be operated by an operator of the casino. Similar to the EGM 200 above, the ATM 200' may include a housing 202 having a display device 204, and a plurality of input devices 206, such as a keypad 208, buttons 210, etc., for receiving user input for performing transactions at the ATM 200' or otherwise interacting with the ATM 200'. The ATM 200' may include an acceptor 212, for receiving currency (i.e., bills and/or coins), tokens, credit or debit cards, or other physical items associated with monetary or other value, such as a medium having a machine-readable code as discussed above, for example. As discussed above, the acceptor 212 may include an optical scanner device and/or an electromagnetic reader device, which may be incorporated into the acceptor 212 and/or other components or separate and apart from the acceptor 212 and/or other components, as desired. The ATM 200' may also include a dispenser 214, for dispensing items, such as physical items having monetary or other value (e.g., awards or prizes) or other items.

Similar to the EGM 200, the ATM 200' may include a processor circuit and a memory coupled to the processor circuit. The memory may include machine-readable instructions that, when executed by the processor circuit, cause the processor circuit to perform operations for operating the ATM 200', and/or other features described herein.

Figure 3A:
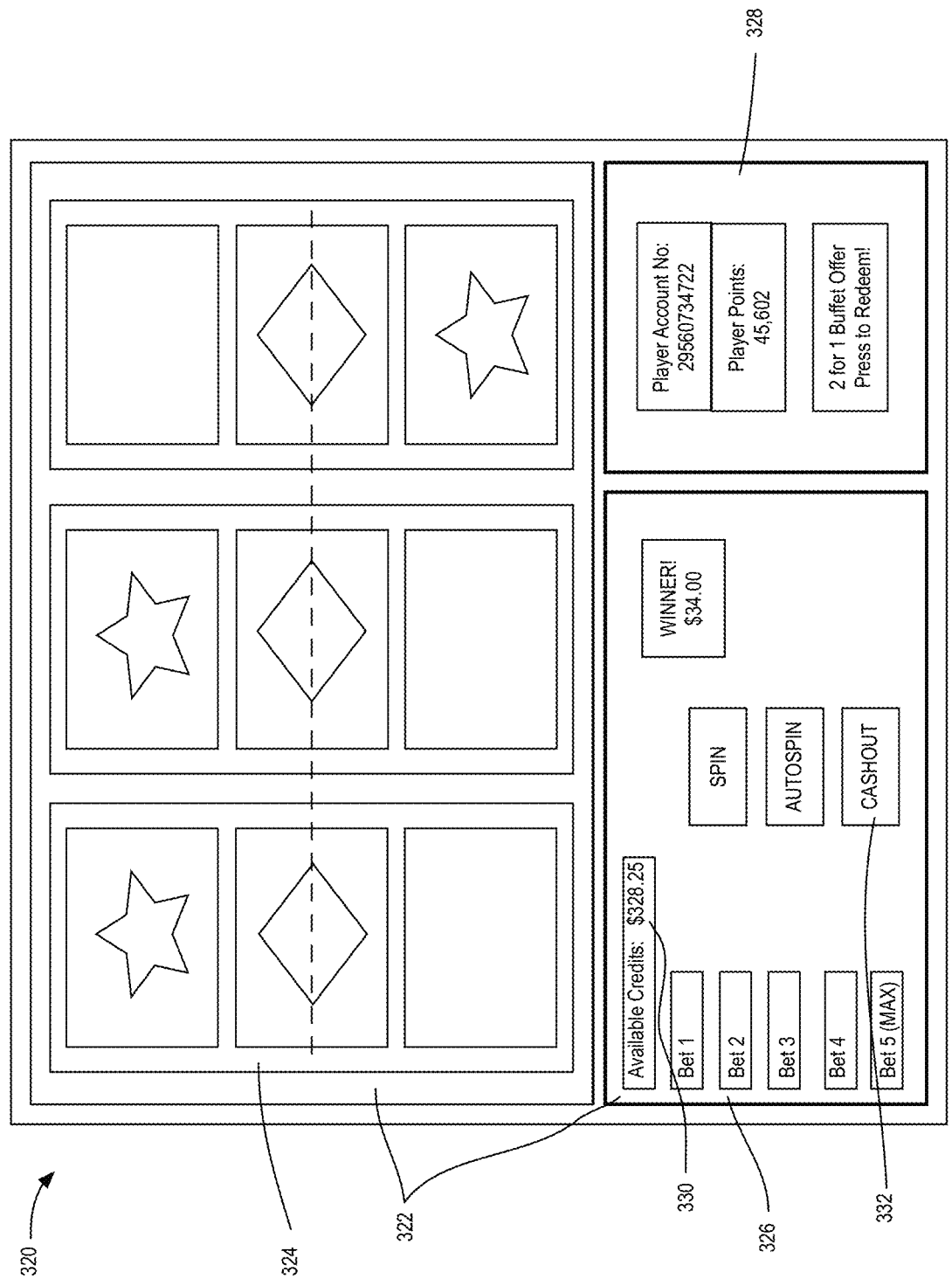
FIGS. 3A and 3B illustrate a graphical user interface (GUI) usable with an electronic kiosk device having features for funding a cashless wallet account, according to some embodiments.
Figure 3B:
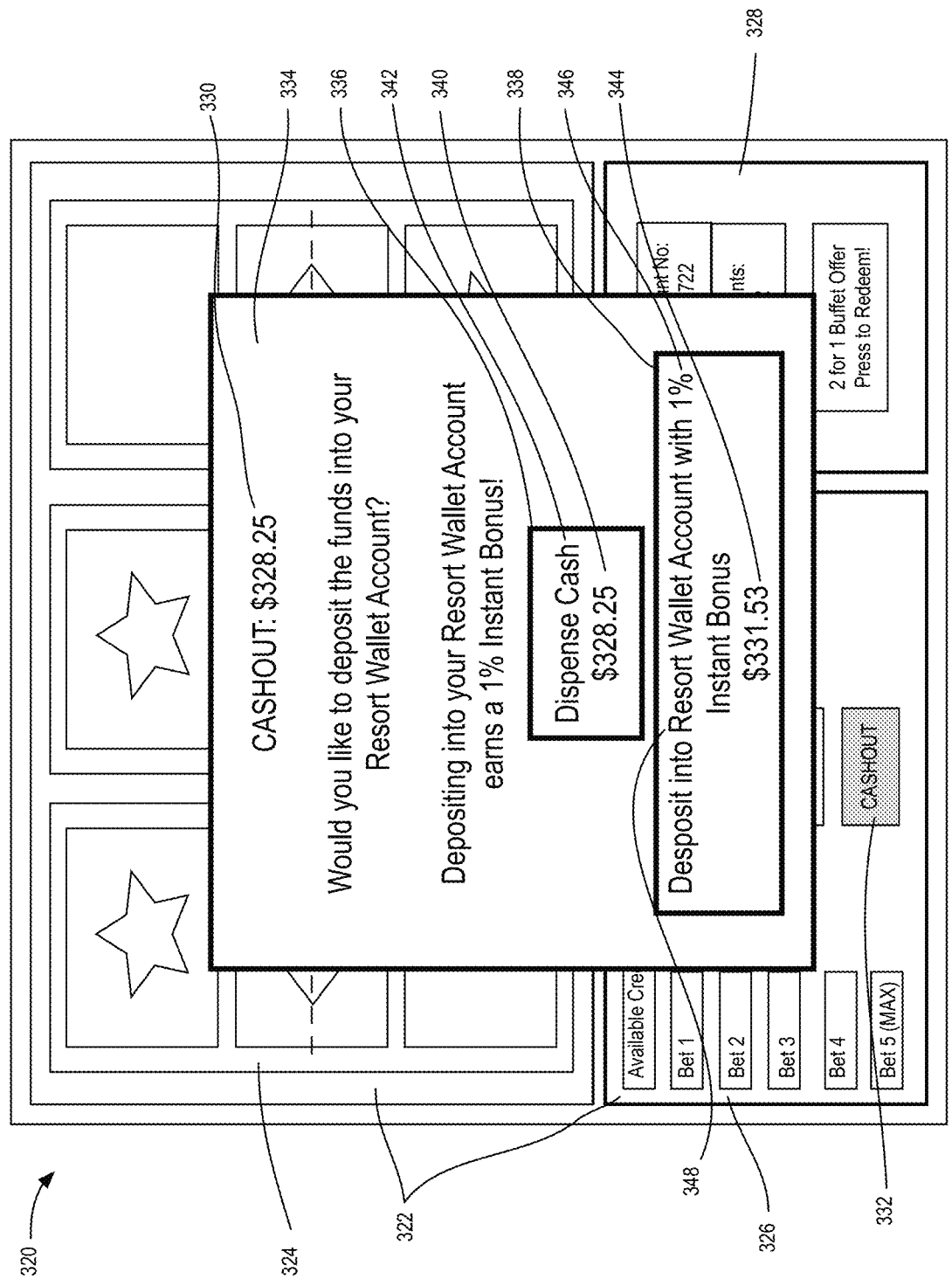

In this regard, FIGS. 3A and 3B illustrate a graphical user interface (GUI) 320 usable with an electronic kiosk device, such as the EGM 200 or ATM 200' above, having features for funding a cashless wallet account, according to some embodiments. Referring now to FIG. 3A, the GUI 320 for the electronic kiosk device (which is an EGM in this embodiment) is partitioned into different display areas 322, including a gaming area 324, a betting interface area 326, and an information display area 328. It should be understood, however, that additional features may be provided by the GUI 320, such as one or more video windows, a social game interface area, and/or a service window area, for example, as desired.

In this example, the betting interface area 326 includes a cashout option 332, which allows a player to receive an available cashout amount 330 in a default format (e.g., cash or other currency, a ticket or voucher, etc.). Referring now to FIG. 3B, when the player activates the cashout option 332, the GUI 320 displays a cashout message 334 offering the player a choice between a first option 336 to receive a first cashout amount 340 and a second option 338 to receive a second cashout amount 344 different from the first cashout amount 340. As used herein, the term "cashout amount" may refer to a quantifiable benefit, including a monetary amount or benefit, or a non-monetary amount or benefit, such as the embodiments described herein.

In this embodiment, the first cashout amount 340 is in a first format 342 (e.g., cash in this example), which is to be dispensed directly to the player from the EGM (e.g., using the dispenser 214 of the EGM 200 of FIG. 2A). The second cashout amount 344 in this embodiment is larger than the first cashout amount 340 and is in a second cashless format 346 (e.g., into a cashless wallet account 348 associated with the player in this example).

Figure 4:
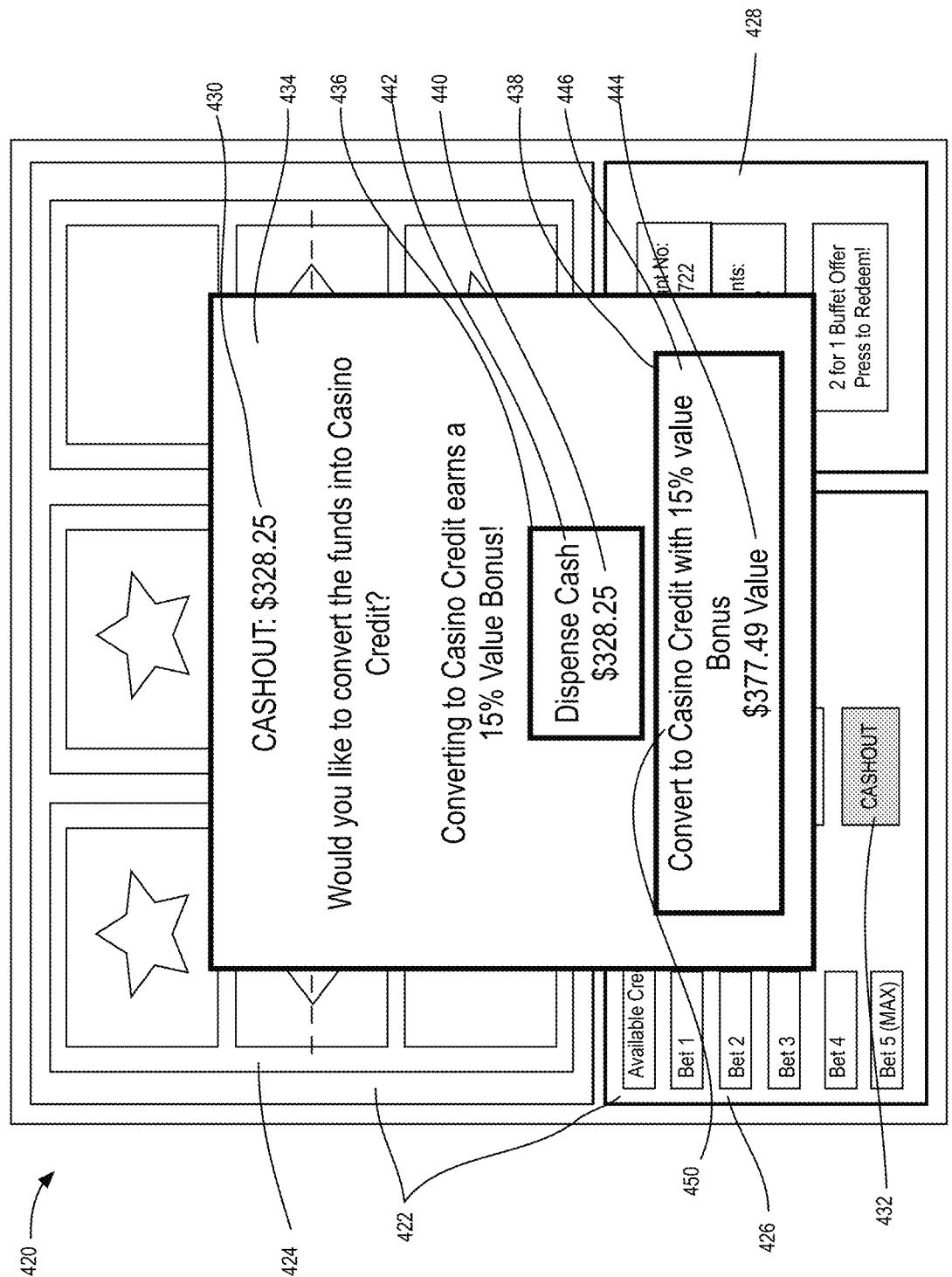
FIG. 4 illustrates another GUI similar to the GUI of FIGS. 3A and 3B having features for funding a cashless wallet account, according to some embodiments.

Other types of cashless cashout amounts are contemplated. For example, referring now to FIG. 4, another GUI 420 similar to the GUI 320 of FIGS. 3A and 3B having features for funding a cashless wallet account is disclosed, according to some embodiments. The GUI 420 in this embodiment is partitioned into different display areas 422, including a gaming area 424, a betting interface area 426, and an information display area 428. The betting interface area 426 includes a cashout option 432, which allows a player to receive an available cashout amount 430 in a default format (e.g., cash or other currency, a ticket or voucher, etc.). When the player activates the cashout option 432, the GUI 420 displays a cashout message 434 offering the player a choice between a first option 436 to receive a first cashout amount 440 as cash, and a second option 438 to receive the second cashout amount 444 in a cashless format 446 that includes casino credit 450, which may be cashable or non-cashable. The casino credit 450 may be redeemable for gaming and/or non-gaming goods and services in or associated with the casino.

Figure 5:
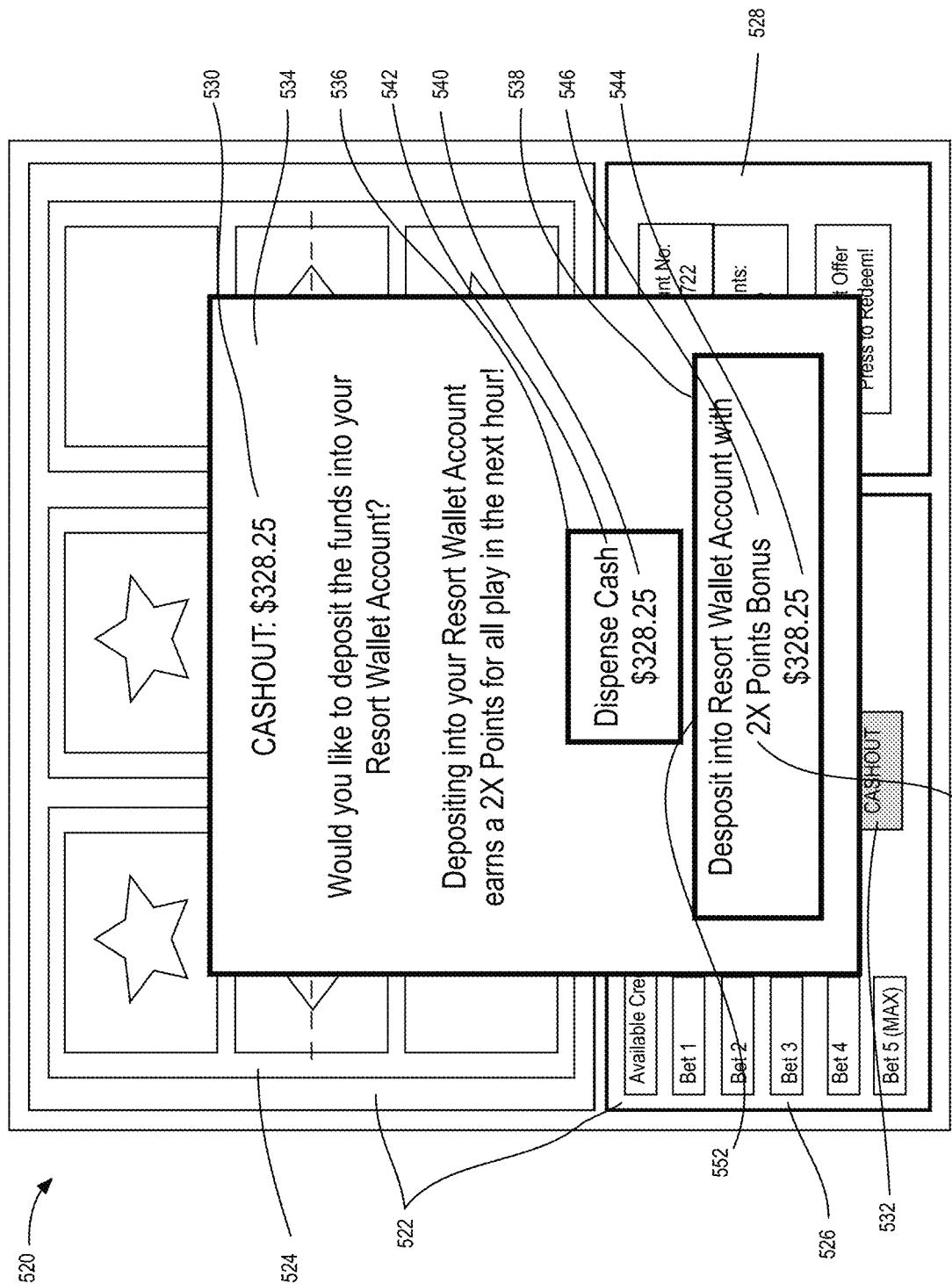
FIG. 5 illustrates another GUI similar to the GUI of FIGS. 3A and 3B having an incentive feature associated with funding the cashless wallet account, according to some embodiments.

In another embodiment, referring now to FIG. 5, a GUI 520 having other features for funding a cashless wallet account is disclosed. The GUI 520 in this embodiment is partitioned into different display areas 522, including a gaming area 524, a betting interface area 526, and an information display area 528. The betting interface area 526 includes a cashout option 532, which allows a player to receive an available cashout amount 530 in a default format (e.g., cash or other currency, a ticket or voucher, etc.). When the player activates the cashout option 532, the GUI 520 displays a cashout message 534 offering the player a choice between a first option 536 to receive a first cashout amount 540 as cash, and a second option 538 to receive the second cashout amount 544 in a cashless format 546 that includes a non-monetary wagering benefit 552. The wagering benefit 552 in this example is an increased rate of points accrual 554 associated with a player account 555, for a wagering game.

Figure 6:
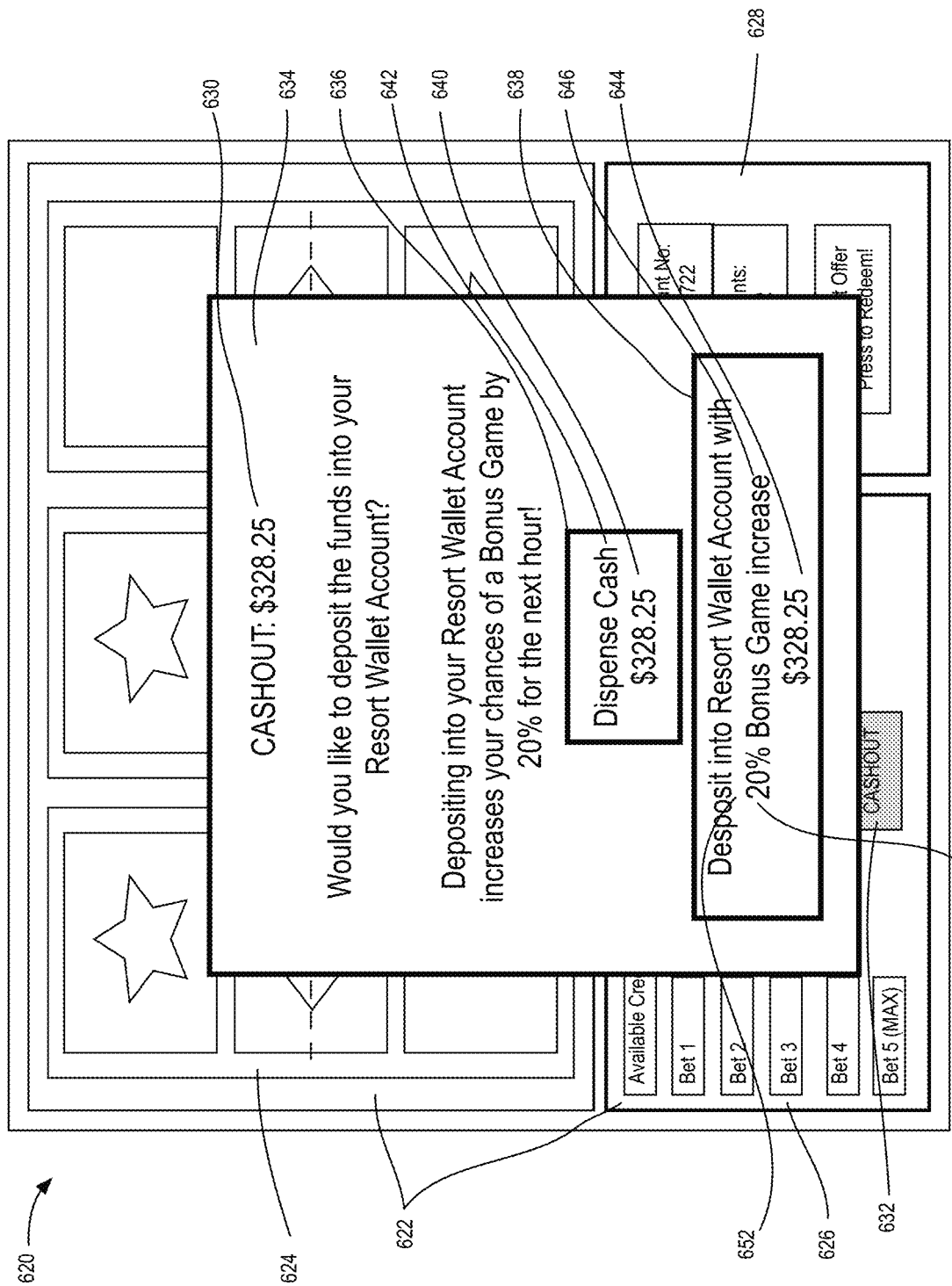
FIG. 6 illustrates another GUI similar to the GUI of FIGS. 3A and 3B having an incentive feature associated with funding the cashless wallet account, according to some embodiments.

In another embodiment, referring now to FIG. 6, a GUI 620 having other features for funding a cashless wallet account is disclosed. The GUI 620 in this embodiment is partitioned into different display areas 622, including a gaming area 624, a betting interface area 626, and an information display area 628. The betting interface area 626 includes a cashout option 632, which allows a player to receive an available cashout amount 630 in a default format (e.g., cash or other currency, a ticket or voucher, etc.). When the player activates the cashout option 632, the GUI 620 displays a cashout message 634 offering the player a choice between a first option 636 to receive a first cashout amount 640 as cash, and a second option 638 to receive the second cashout amount 644 in a cashless format 646 (e.g., the player's cashless wallet account) that includes a non-monetary wagering benefit 652. The wagering benefit 652 in this example is an increased probability of triggering a bonus game 656 by the player of the wagering game.

Figure 7:
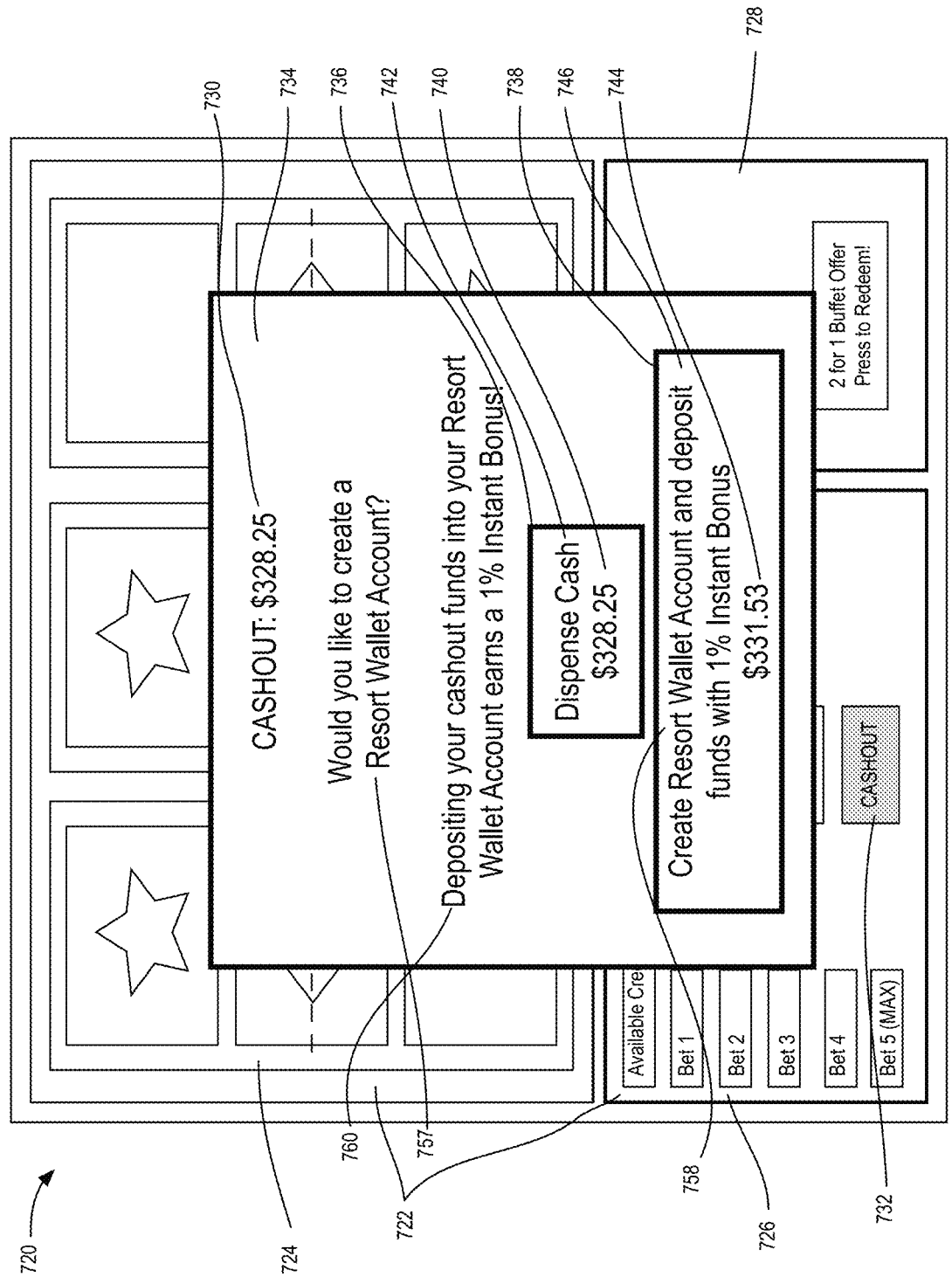
FIG. 7 illustrates a GUI similar to the GUI of FIGS. 3A and 3B having features for creating a cashless wallet account, according to some embodiments.

In some embodiments, it may be necessary to create an account, such as a cashless wallet account, before the player can cashout the amount into the cashless wallet account. In this regard, FIG. 7 illustrates a GUI 720 similar to the GUI of FIGS. 3A-6 above, having features for creating a cashless wallet account 757, according to some embodiments. The GUI 720 in this embodiment is partitioned into different display areas 722, including a gaming area 724, a betting interface area 726, and an information display area 728. The betting interface area 726 includes a cashout option 732, which allows a player to receive an available cashout amount 730 in a default format (e.g., cash or other currency, a ticket or voucher, etc.). When the player activates the cashout option 732, the GUI 720 displays a cashout message 734 offering the player a choice between a first option 736 to receive a first cashout amount 740 as cash, and a second option 738 to receive the second cashout amount 744 in a cashless format 746 (e.g., the player's cashless wallet account). In response to the player selecting the second option 738, the EGM and/or system may determine that determine whether the selection is associated with an account identifier identifying a cashless wallet account. If the EGM and/or system determines that the selection is not associated with an account identifier identifying a cashless wallet account, a message 760 requesting creation of a cashless wallet account 757 may be presented to the player to facilitate creation of the cashless wallet account 757 and an option 758 may be presented to create the cashless wallet account 757. After the cashless wallet account 757 is created, the second cashout amount 744 may be deposited into the cashless wallet account 757.

Figure 8:
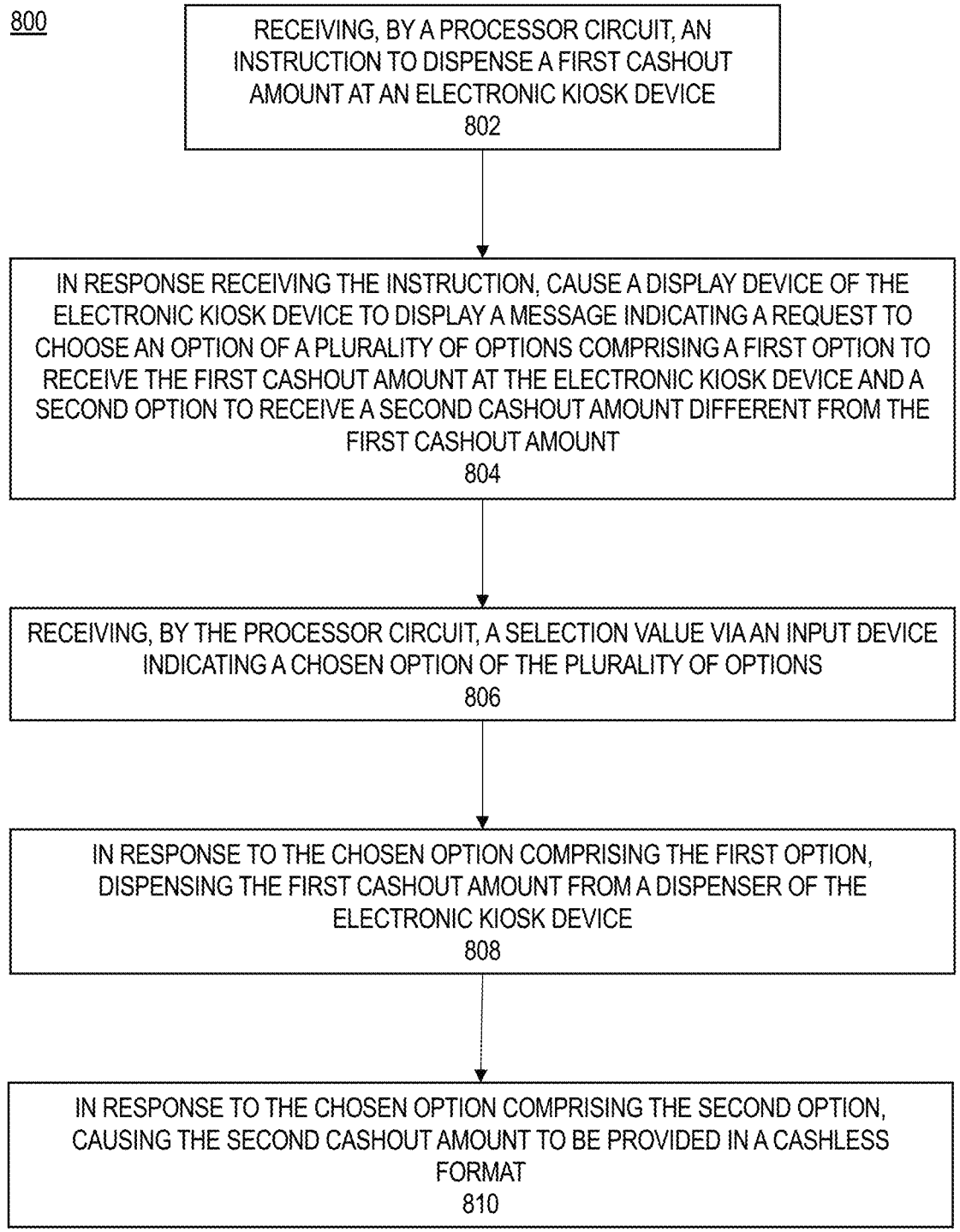
FIG. 8 is a flowchart illustrating operations of systems/methods according to some embodiments.

These and other features may be implemented as operations that may be executed by a processor circuit of a computing device. In this regard, FIG. 8 is a flowchart illustrating operations 800 of systems/methods according to some embodiments. The operations 800 may include receiving, by a processor circuit, an instruction to dispense a first cashout amount at an electronic kiosk device (Block 802). Receiving the instruction may include reading a machine-readable code that includes the instruction by a reader device. The reader device may be an optical scanner device that optically reads a printed code on a physical article, or may be an electromagnetic reader device that electromagnetically reads the machine-readable code.

The operations 800 may further include, in response to receiving the instruction, cause a display device of the electronic kiosk device to display a message indicating a request to choose an option of a plurality of options comprising a first option to receive the first cashout amount at the electronic kiosk device and a second option to receive a second cashout amount different from the first cashout amount (Block 804). The operations 800 may further include receiving, by the processor circuit, a selection value via an input device indicating a chosen option of the plurality of options (Block 806). The operations 800 may further include, in response to the chosen option comprising the first option, dispensing the first cashout amount from a dispenser of the electronic kiosk device (Block 808). The first cashout amount may have a first monetary value. Causing the first cashout amount to be dispensed from the dispenser may include causing the currency having the first monetary value to be dispensed from the dispenser.

The operations 800 may further include, in response to the chosen option comprising the second option, causing the second cashout amount to be provided in a cashless format (Block 810). The second cashout amount may include currency or a credit balance having a second monetary value, which may be greater than the first monetary value. Causing the second cashout amount to be provided in the cashless format may include causing the second cashout amount to be deposited into a cashless wallet account. The second cashout amount may also include a non-monetary benefit, such as a wagering benefit for a player of a wagering game. For example, the wagering benefit may include an increased probability of triggering a bonus game by the player of the wagering game.

The operations 800 may further include determining whether the instruction is associated with an account identifier identifying a cashless wallet account. In response to determining that the instruction is associated with the account identifier identifying the cashless wallet account, the message indicating the request to choose an option of the plurality of options may be displayed. In response to determining that the instruction is not associated with an account identifier identifying a cashless wallet account, a message indicating a request to create a cashless wallet account may be displayed. In response to a user of the electronic kiosk device creating the cashless wallet account, the account identifier identifying the cashless wallet account may be received, which may cause the second cashout amount to be deposited into the cashless wallet account. Causing the processor circuit to determine that the instruction is associated with the account identifier identifying the cashless wallet account may further cause the processor circuit to determine a player identifier associated with a player account associated with the instruction, and retrieve the account identifier identifying the cashless wallet account based on the player identifier.

Figure 9:
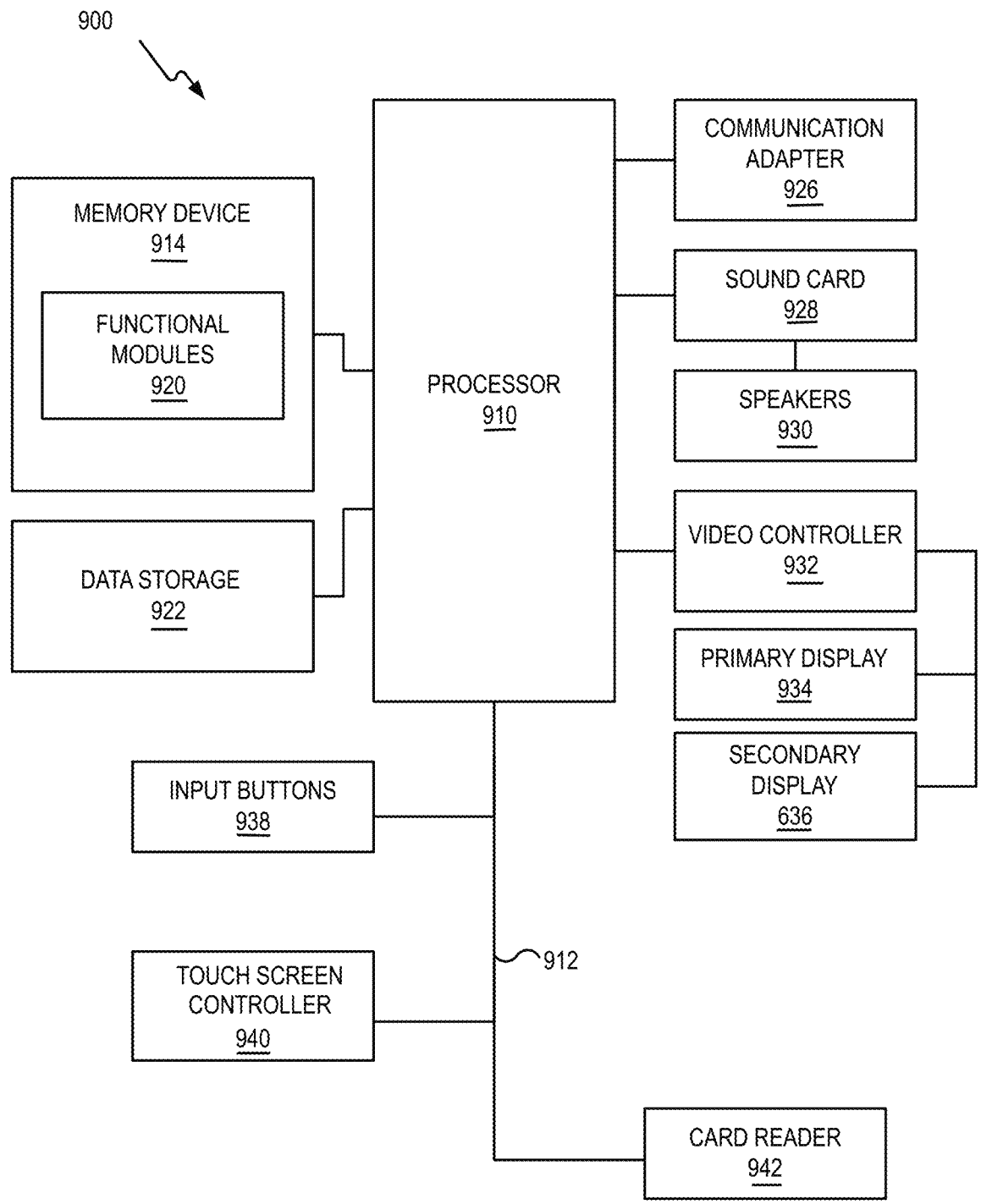
FIG. 9 is a schematic block diagram illustrating various components of a computing device according to some embodiments.

Referring now to FIG. 9, a block diagram that illustrates various components of a computing device 900, which may embody or be included as part of the devices, systems, and/or components above, according to some embodiments.

As shown in FIG. 9, the computing device 900 may include a processor circuit 910 that controls operations of the computing device 900. Although illustrated as a single processor, multiple special purpose and/or general-purpose processors and/or processor cores may be provided in the computing device 900. For example, the computing device 900 may include one or more of a video processor, a signal processor, a sound processor and/or a communication controller that performs one or more control functions within the computing device 900. The processor circuit 910 may be variously referred to as a "controller," "microcontroller," "microprocessor" or simply a "computer." The processor circuit 910 may further include one or more application-specific integrated circuits (ASICs).

Various components of the computing device 900 are illustrated in FIG. 9 as being connected to the processor circuit 910. It will be appreciated that the components may be connected to the processor circuit 910 and/or each other through one or more busses 912 including a system bus, a communication bus and controller, such as a USB controller and USB bus, a network interface, or any other suitable type of connection.

The computing device 900 further includes a memory device 914 that stores one or more functional modules 920 for performing the operations described above. Alternatively, or in addition, some of the operations described above may be performed by other devices connected to the network, such as the network 50 of the system 10 of FIG. 1, for example. The computing device 900 may communicate with other devices connected to the network to facilitate performance of some of these operations. For example, the computing device 900 may communicate and coordinate with certain displays to identify elements of a race being displayed by a particular display.

The memory device 914 may store program code and instructions, executable by the processor circuit 910, to control the computing device 900. The memory device 914 may include random access memory (RAM), which can include non-volatile RAM (NVRAM), magnetic RAM (ARAM), ferroelectric RAM (FeRAM) and other forms as commonly understood in the gaming industry. In some embodiments, the memory device 914 may include read only memory (ROM). In some embodiments, the memory device 914 may include flash memory and/or EEPROM (electrically erasable programmable read only memory). Any other suitable magnetic, optical and/or semiconductor memory, such as data storage 922, may operate in conjunction with the gaming device disclosed herein.

The computing device 900 may include a communication adapter 926 that enables the computing device 900 to communicate with remote devices, such as the wireless network, another computing device 900, and/or a wireless access point, over a wired and/or wireless communication network, such as a local area network (LAN), wide area network (WAN), cellular communication network, or other data communication network, e.g., the network 50 of FIG. 1.

The computing device 900 may include one or more internal or external communication ports that enable the processor circuit 910 to communicate with and to operate with internal or external peripheral devices, such as a sound card 928 and speakers 930, video controllers 932, a primary display 934, a secondary display 936, input buttons 938 or other devices such as switches, keyboards, pointer devices, and/or keypads, a touch screen controller 940, a card reader 942, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 910. Although illustrated as being integrated with the computing device 900, any of the components therein may be external to the computing device 900 and may be communicatively coupled thereto. Although not illustrated, the computing device 900 may further include a rechargeable and/or replaceable power device and/or power connection to a main power supply, such as a building power supply.

In some embodiments, the computing device 900 may include a head mounted device (HMD) and may include optional wearable add-ons that include one or more sensors and/or actuators. Including ones of those discussed herein. The computing device 900 may be a head-mounted mixed-reality device configured to provide mixed reality elements as part of a real-world scene being viewed by the user wearing the computing device 900.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system for funding a cashless wallet account, the system comprising:
    a processor circuit; and
    a memory coupled to the processor circuit, the memory comprising machine-readable instructions that, when executed by the processor circuit, cause the processor circuit to:
      in response to receiving a cashout instruction from an electronic kiosk device, determine an identity of a user providing the cashout request;
      determine whether the identified user is associated with an existing cashless wallet account;
      in response to a determination that the identified user is not associated with an existing cashless wallet account, cause a display device of the electronic kiosk device to display a first message indicating a request to choose an option of a plurality of options comprising a first option to receive a first monetary cashout amount at the electronic kiosk device and a second option to deposit a second monetary cashout amount comprising the first monetary cashout amount and a new account creation incentive amount into a new cashless wallet account;
      in response to receiving a first selection instruction indicative of selection of the first option, cause the first monetary cashout amount to be dispensed from a dispenser of the electronic kiosk device; and
      in response to receiving a second selection instruction indicative of selection of the second option, create the new cashless wallet account for the user and cause the second monetary cashout amount to be deposited into the new cashless wallet account.

2. The system of claim 1, wherein the instructions that cause the first monetary cashout amount to be dispensed from the dispenser further cause the first monetary cashout amount to be dispensed as currency.

3. The system of claim 1, wherein, in response to a determination that the identified user is associated with an existing cashless wallet account, the instructions further cause the processor circuit to:
    cause the display device to display a second message indicating a request to choose an option of a plurality of options comprising the first option to receive a first monetary cashout amount at the electronic kiosk device and a third option to deposit a third monetary cashout amount different from the first monetary cashout amount into the existing cashless wallet account.

4. The system of claim 3, wherein the second monetary cashout amount is different from the third monetary cashout amount.

5. The system of claim 1, wherein the instructions further cause the processor circuit to, in response to receiving the second selection instruction, cause a non-monetary benefit to be provided at the electronic kiosk device.

6. The system of claim 5, wherein the non-monetary benefit comprises an increased rate of point accrual for play of a wagering game by a player associated with the cashless wallet account.

7. The system of claim 1, wherein the electronic kiosk device comprises an electronic gaming device.

8. The system of claim 1, wherein the instructions further cause a reader device of the electronic kiosk device to read a machine-readable code comprising the cashout instruction.

9. The system of claim 8, wherein the machine-readable code comprises a printed code on a physical article, and
    wherein the reader device comprises an optical scanner device to optically read the printed code on the physical article.

10. The system of claim 8, wherein the reader device comprises an electromagnetic reader device to electromagnetically read the machine-readable code.

11. A system for funding a cashless wallet account, the system comprising:
    a processor circuit; and
    a memory coupled to the processor circuit, the memory comprising machine-readable instructions that, when executed by the processor circuit, cause the processor circuit to:
      receive a cashout instruction from an electronic kiosk device in communication with the system;
      in response to the cashout instruction,
      cause a display device of the electronic kiosk device to display a first message indicating a request to choose an option of a plurality of options comprising a first option to receive a first monetary cashout amount at the electronic kiosk device and a second option to create a new cashless wallet account, and provide a new account creation incentive to the player;
      in response to receiving a first selection instruction indicative of selection of the first option, cause the first monetary cashout amount to be dispensed from a dispenser of the electronic kiosk device; and
      in response to receiving a second selection instruction indicative of selection of the second option:

create the new cashless wallet account; and provide the new account creation incentive to the player.

12. The system of claim 11, wherein the machine-readable instructions further cause the processor circuit to:

based on a determination that the cashout instruction is associated with an existing cashless wallet account, cause the display device to display a second message indicating a request to choose an option of a plurality of options comprising the first option to receive the first monetary cashout amount at the electronic kiosk device and a third option to deposit a third monetary cashout amount different from the first monetary cashout amount into the existing cashless wallet account.

13. The system of claim 11, wherein the instructions further cause the processor circuit to:

determine a player identifier associated with a player account associated with the cashout instruction;

request an account identifier identifying the existing cashless wallet account based on the player identifier;

in response to receiving a first message comprising the account identifier, determine that the cashout instruction is associated with an existing cashless wallet account; and in response to a failure to receive the first message, determine that the cashout instruction is not associated with an existing cashless wallet account.

14. The system of claim 11, wherein the non-monetary benefit comprises an increased rate of point accrual for play of a wagering game by a player associated with the cashless wallet account.

15. An electronic kiosk device for funding a cashless wallet account, the device comprising:

a display device;
an input device;
a dispenser;
a processor circuit; and
a memory coupled to the processor circuit, the memory comprising machine-readable instructions that, when executed by the processor circuit, cause the processor circuit to:

receive a cashout instruction from a user of the electronic kiosk device via the input device;

in response to receiving the cashout instruction, display a message at the display device indicating a request to choose an option of a plurality of options comprising a first option to receive a first monetary cashout amount at the electronic kiosk device and a second option to deposit a second monetary cashout amount into a cashless wallet account and to receive a new account creation incentive comprising a non-monetary benefit comprising an increased rate of point accrual for play of a wagering game by a player associated with the cashless wallet account;

receive an input at the input device indicative of a selection instruction;

in response to the selection instruction indicating selection of the first option, cause the first monetary cashout amount to be dispensed from a dispenser of the electronic kiosk device as currency; and in response to the selection instruction indicating selection of the second option, cause the second monetary cashout amount to be deposited into the cashless wallet account and provide the increased rate of point accrual for play of the wagering game by the player.

16. The electronic kiosk device of claim 15, wherein the first monetary cashout amount and the second monetary cashout amount comprise different monetary amounts in a common currency, and wherein the new account creation incentive further comprises a difference between the second monetary cashout amount and the first monetary cashout amount.

17. The electronic kiosk device of claim 15, wherein the electronic kiosk device comprises an electronic gaming device.

* * * * *